Nov. 15, 1932.  O. F. MARVIN  1,887,729
PROCESS OF MANUFACTURING TUNGSTEN CARBIDE
Filed Feb. 3, 1930
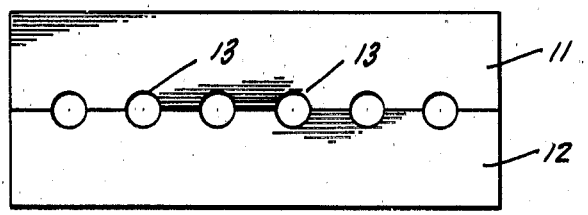
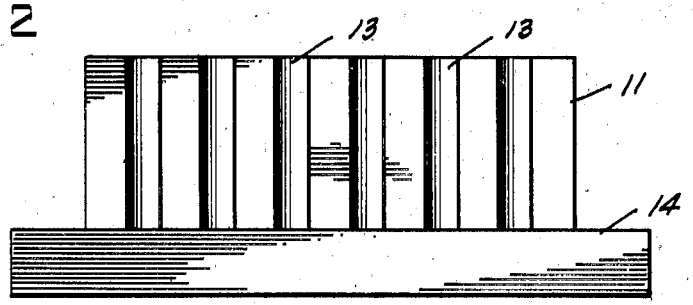
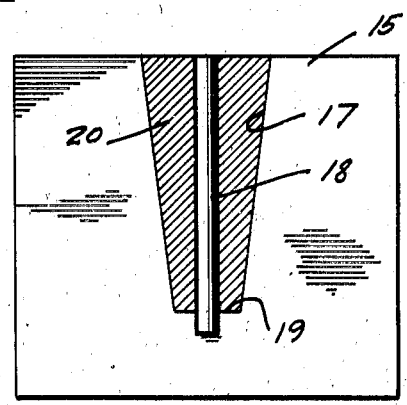
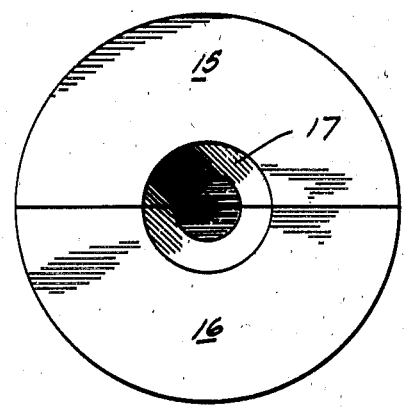
INVENTOR
Orrin F. Marvin
BY John F. Lam
ATTORNEY Patented Nov. 15, 1932

1,887,729

UNITED STATES PATENT OFFICE

ORRIN F. MARVIN, OF LOS ANGELES, CALIFORNIA, ASSIGNOR TO MILLS ALLOYS, INC., OF LOS ANGELES, CALIFORNIA, A CORPORATION OF DELAWARE

PROCESS OF MANUFACTURING TUNGSTEN CARBIDE

Application filed February 3, 1930. Serial No. 425,581.

This invention relates to the manufacture of tungsten carbide.

Tungsten carbide is now well-known. It is a chemical composition of great hardness and having a very high melting point. For these reasons it is favored as an abrasive, since if properly made, it is almost as hard as a diamond, yet it is considerably less expensive.

To obtain a high grade product, it is now known that a tungsten mixture can be melted under the action of a carbon electric arc, and when the chemical reaction is complete, the molten alloy is rapidly chilled by casting it into cool molds. This has been found essential, because of the peculiar characteristics of tungsten and its carbides. If the cooling is permitted to take place slowly, there is a tendency for the chemical reaction to reverse, and even if this does not occur, the fineness of the grain structure is materially reduced.

The electric furnace that can produce the molten tungsten carbide must also be such as will produce quick, uniform heating, as the temperatures required are from 5000 to 6000 degrees Fahrenheit. One such furnace is described in the Mills Patent No. 1,719,558, issued July 2, 1929. In that patent, the necessity of using a cool mold is disclosed.

Due to the extreme temperatures encountered in the manufacture of tungsten carbide, it has been recognized that the molds must be made of a material capable of withstanding these temperatures without destruction. Graphite has accordingly been chosen for this purpose. It has, however, certain disadvantages which I shall now discuss.

When carbon or graphite is used as a mold for tungsten carbide, the intense heat will cause carbon vapor to form. Also, some carbon oxide will be produced. This evolution of gas may result in numerous pores and blow holes, which are of course detrimental. Furthermore, there is a tendency for the tungsten carbide to react chemically with the carbon, causing overcarburization and consequent reduction in quality.

It is one of the objects of my invention to overcome these disadvantages of the graphite molds, and especially by the use of a mold made from a material that is chemically inert even at the high temperatures reached during the process of casting.

I find that the metal copper fulfills the requirements quite well. Although it is by no means so hard to melt, yet its thermal conductivity is so high that tungsten carbide can be safely cast in it without any destruction of the molds. This result of course was hardly to be expected; but experience shows that if the molds are made sufficiently massive, the heat dissipation through the copper occurs so rapidly that the copper withstands the high heat.

Copper, if moderately pure, will not combine with tungsten carbide either mechanically or chemically; and consequently it will not form a gas when acting as a chill for tungsten carbide. Therefore, the finished material has a remarkable density, and is free from any appreciable pores or blow holes.

Of course, other materials having physical and chemical properties similar to copper can be used in place of it; but since so far as I know, copper has the highest thermal conductivity of any materials, it is to my mind probably the only suitable material for the above mentioned purposes, known at the present time.

In the accompanying drawing I show a few forms of molds that can be used in practicing my invention. These forms are merely illustrative, and it is obvious that other forms could be used. The scope of the invention itself can be best ascertained from the appended claims.

Referring to the drawing:

Figure 1 is a plan view of a split multiple mold, for casting solid bars of tungsten carbide;

Fig. 2 is an elevation of one of the mold halves shown in Fig. 1;

Fig. 3 is a top plan view of a split mold for casting tubular rods of tungsten carbide; and Fig. 4 is an elevation of the mold, one of the halves being removed, and the core being shown in place.

In Figs. 1 and 2, I show the mold halves 11, 12, in which round bars can be cast. It is seen that a common mold is used for a plurality of the bars, which of course fill the mold spaces 13. The mold is made in two parts merely for convenience in removing the cast bars. It can be clamped together during molding, and can rest of course, on a block 14 of copper. The mold is massive, in comparison with the mold spaces 13, which are usually of the order of an inch or less in diameter. The bars thus cast are used in any desired way; for example, as an abrasive, embedded at the cutting edge of drilling or reaming tools, or the like. The copper used in making the mold should be substantially pure.

In Figs. 3 and 4, the copper mold is shown as comprising a pair of semicircular halves 15, 16. In this case, the mold has a circular hole 17 at the center, which does not extend entirely through the mold parts 15, 16. In the present instance this aperture is shown as tapered, to cast a tapered rod. In order to cast a tubular rod, a central core 18 can be supported inside the aperture 17 and as by being set in a socket at the bottom 19 of the aperture 17. Thus a mold space is formed between aperture 17 and this core, which may be poured with tungsten carbide as indicated by the section lined space 20 in Fig. 4.

In this instance also, the mold is split to facilitate removal of the casting. The two halves 15, 16 can be clamped during the process of casting.

Since there is little opportunity for conducting heat away from core 18, it is preferable to make this part out of graphite. However, the massive copper parts 15, 16 conduct the heat so rapidly that no opportunity exists for any deleterious reactions during the short period of cooling, between the tungsten carbide and the graphite core 18.

The tubular rod cast in such a mold may be of any desired size. I have cast some successfully in such molds, which rods were about an inch in external diameter and several inches long.

I find that when such copper molds as I have described are used, the chilling of the molten tungsten carbide is rapid; there are no blow holes or pores, and the grain structure of the castings is excellent.

I claim:

1. A copper mold for casting tungsten carbide.

2. A metal mold for casting tungsten carbide, said mold having high heat conductivity and chemically inert as regards tungsten carbide.

3. A massive copper mold for casting tungsten carbide.

4. A massive metal mold for casting tungsten carbide, said mold having high heat conductivity and chemically inert as regards tungsten carbide.

5. The process which comprises securing a molten mass of tungsten carbide, and casting it into a massive mold made from substantially pure copper.

In testimony whereof I have hereunto set my hand.

ORRIN F. MARVIN.